No. 775,810.

Patented November 22, 1904.

UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF PREPARING DIALKYLBARBITURIC ACID.

SPECIFICATION forming part of Letters Patent No. 775,810, dated November 22, 1904.

Application filed August 4, 1904. Serial No. 219,506. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD Co., of New York,) have invented a new and useful Improvement in Processes of Preparing Dialkylbarbituric Acids; and I do hereby declare the following to be an exact and clear description of my invention.

My invention relates to a new process for the production of dialkylbarbituric acids (2-4-6-trioxy-5-dialkylpyrimidins) having the following general formula:

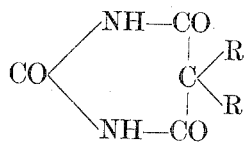

(R meaning alkyl radicals,) which bodies possess valuable therapeutic, especially soporific, properties. The process for the preparation of these compounds consists in first condensing thio-urea (thio-carbamid) with dialkylated malonitrils of the general formula

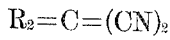

by means of alkaline condensing agents; secondly, splitting off the imino groups and replacing them by oxygen in 4 and 6 position from the resulting 2-thio-4-6-diimino-5-dialkylpyrimidins of the general formula

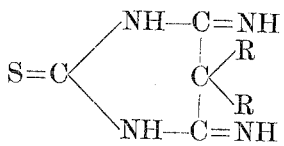

by treatment with saponifying agents, and, finally, desulfurizing the 2-thio-4-6-dioxy-5-dialkyl-pyrimidins thus produced by treatment with oxidizing agents, by which operation the sulfur is replaced by oxygen.

In order to carry out my process practically, I can, for instance, proceed as follows: Seventy-six parts of thio-urea and one hundred and twenty-two parts of diethylmalonitril are added to a solution of forty-six parts of sodium in five hundred parts of alcohol, and the resulting mixture is heated for two hours on the water-bath. The alcohol is distilled off, and the resulting residue is neutralized by means of dilute sulfuric acid. After a recrystallization from hot water the new body is obtained in the shape of yellowish needles melting at 230° centigrade. For the saponification fifty parts of the 2-thio-4-6-diimino-5-diethylpyrimidin thus produced are heated with one hundred parts of a thirty-per cent. sulfuric acid for three hours on the water-bath. After cooling it is filtered off, and twenty parts of the 2-thio-4-6-dioxy-5-diethylpyrimidin thus obtained are introduced into fifty parts of pure concentrated nitric acid. The oxidation is completed in a short time. The excess of nitric acid is then neutralized by the addition of sodium carbonate, and the diethylbarbituric acid thus precipitated is purified by a recrystallization from water.

Instead of an alcoholic solution of sodium ethylate other alkaline condensing agents—such as solid alkaline alcoholates, sodium amid, or the like—can be employed.

The saponification and the splitting off of sulfur can also be carried out with other saponifying or other oxidizing agents.

The process proceeds in an analogous manner for the production of other dialkylbarbituric acids.

Having now described my invention and in what manner the same is to be performed, what I claim as new, and desire to secure by Letters Patent, is—

1. The process for the production of dialkylbarbituric acids having the above-given general formula, which process consists in first condensing thio-urea with dialkylated malonitrils by means of alkaline condensing agents, secondly splitting off the imino groups in 4 and 6 position from the resulting 2-thio-4-6-diimino-5-dialkylpyrimidins by treatment with saponifying agents, and finally desulfurizing the 2-thio-4-6-dioxy-5-dialkylpyrimidins, thus produced, substantially as hereinbefore described.

2. The process for the production of diethylbarbituric acid, which process consists in first condensing thio-urea with diethylmalonitril by means of alkaline condensing agents, secondly splitting off the imino groups in 4 and 6 position from the resulting 2-thio-4-6-diimino-5-diethylpyrimidin by treatment with saponifying agents, and finally desulfurizing the resulting 2-thio-4-6-dioxy-5-diethylpyrimidin, substantially as hereinbefore described.

3. The process for the production of diethylbarbituric acid, which process consists in first condensing thio-urea with diethylmalonitril by means of sodium ethylate, secondly splitting off the imino groups in 4 and 6 position from the resulting 2-thio-4-6-diimino-5-diethylpyrimidin by treatment with hot sulfuric acid and finally desulfurizing the resulting 2-thio-4-6-dioxy-5-diethylpyrimidin by treatment with nitric acid, substantially as hereinbefore described.

In testimony whereof I have signed my name in the presence of two subscribing witnesses.

MAX ENGELMANN.

Witnesses:
   OTTO KÖNIG,
   J. A. RITTERSHAUS.